United States Patent
Moncomble (10) Patent No.: US 9,549,002 B2
(45) Date of Patent: Jan. 17, 2017

(54) METHOD AND DEVICE FOR MAKING AVAILABLE AT LEAST ONE COMMUNICATION DATUM

(71) Applicant: Orange, Paris (FR)

(72) Inventor: Ghislain Moncomble, Plestin les Greves (FR)

(73) Assignee: ORANGE, Paris (FR)

( * ) Notice: Subject to any disclaimer, the term of this patent is extended or adjusted under 35 U.S.C. 154(b) by 42 days.

(21) Appl. No.: 14/381,863

(22) PCT Filed: Feb. 15, 2013

(86) PCT No.: PCT/FR2013/050313
§ 371 (c)(1),
(2) Date: Aug. 28, 2014

(87) PCT Pub. No.: WO2013/128094
PCT Pub. Date: Sep. 6, 2013

(65) Prior Publication Data
US 2015/0055646 A1   Feb. 26, 2015

(30) Foreign Application Priority Data
Feb. 28, 2012  (FR) ..................... 12 51788

(51) Int. Cl.
*H04L 29/06* (2006.01)
*H04M 3/42* (2006.01)
*H04M 7/00* (2006.01)

(52) U.S. Cl.
CPC .......... *H04L 65/1069* (2013.01); *H04L 65/00* (2013.01); *H04M 3/42* (2013.01); *H04M 7/003* (2013.01)

(58) Field of Classification Search
CPC .... H04M 7/003; H04M 15/00; H04M 7/0036; H04L 29/06027; H04L 29/06176
See application file for complete search history.

(56) References Cited

U.S. PATENT DOCUMENTS

| | | | |
|---|---|---|---|
| 2006/0010379 A1* | 1/2006 | Kashi | 715/531 |
| 2007/0127650 A1* | 6/2007 | Altberg et al. | 379/114.13 |
| 2008/0275813 A1* | 11/2008 | Altberg et al. | 705/39 |
| 2008/0310604 A1* | 12/2008 | Agarwal et al. | 379/88.18 |
| 2009/0279538 A1* | 11/2009 | Merino Gonzalez et al. | 370/352 |
| 2011/0249621 A1* | 10/2011 | Harris | H04M 7/003 370/328 |

FOREIGN PATENT DOCUMENTS

| | | |
|---|---|---|
| GB | 2440682 A | 2/2008 |
| WO | 2008070605 A1 | 6/2008 |

OTHER PUBLICATIONS

International Search Report dated Apr. 15, 2013 for corresponding International Patent Application No. PCT/FR2013/050313, filed Feb. 15, 2013.
English translation of the International Preliminary Report on Patentability dated Sep. 22, 2014 for corresponding International Patent Application No. PCT/FR2013/050313, filed Feb. 15, 2013.
English translation of the French Written Opinion dated Sep. 28, 2015 for corresponding French Patent Application No. 1251788, filed Feb. 28, 2012.
Natarajan et al: "Videotext OCR using Hidden Markov Models", Proceedings of 6th International Conference on Document Analysis and Recognition, 2001, pp. 947-951. XP010560642.

* cited by examiner

*Primary Examiner* — Jung Park
(74) *Attorney, Agent, or Firm* — David D. Brush; Westman, Champlin & Koehler, P.A.

(57) ABSTRACT

A method and a device are provided for making available at least one communication datum retrieved during consultation of a multimedia stream on a first terminal. The method includes a step of reception of a request for obtaining the at least one communication datum, a step of extraction of the at least one communication datum from the multimedia stream, a step of transmission to at least one second terminal of the at least one communication datum extracted. The communication datum transmitted thus makes it possible to implement on the second terminal an application making it possible to establish a multimedia communication between the second terminal and a remote device.

10 Claims, 2 Drawing Sheets

METHOD AND DEVICE FOR MAKING AVAILABLE AT LEAST ONE COMMUNICATION DATUM

CROSS-REFERENCE TO RELATED APPLICATIONS

This Application is a Section 371 National Stage Application of International Application No. PCT/FR2013/050313, filed Feb. 15, 2013, the content of which is incorporated herein by reference in its entirety, and published as WO 2013/128094 on Sep. 6, 2013, not in English.

FIELD OF THE INVENTION

The invention lies in the field of telecommunication networks. It relates to a device and a method for making available, by a first terminal, at least one communication datum intended for at least one second terminal and allowing the setting up of a multimedia communication between the second terminal and a remote terminal.

PRIOR ART

A service of "Click to Call" type, also called immediate call, is a very widespread application in the field of Internet applications. From the consultation of a web page displaying phone numbers, a user can, by clicking on the displayed phone numbers, trigger the setting up of a phone call to the user who can be contacted by the phone numbers displayed, from for example a VoIP (Voice over Internet Protocol) phone terminal, connected to his or her consultation terminal. The call can also be sent from a mobile terminal, for example, the number of which has been entered into the "Click to Call" application beforehand.

DRAWBACK OF THE PRIOR ART

In order to set up the call from any terminal, the technology of the prior art requires the prior registration by a user of the numbers of the terminal from which the user wishes to make the call. The use of the "Click to Call" application on a computer of PC (Personal Computer) type shared between several users, for example in a cybercafe, or a family home, becomes complicated. Indeed, each user generally possesses his or her own terminal and wishes to make the call from it. Each user must then systematically enter his or her phone numbers into the application of the shared terminal. This results in a waste of time for the user and a mechanism for disclosing his or her personal numbers that has poor security.

Other similar problems appear when retrieving a television program in which a user is prompted to make a call or send an SMS (Short Message Service) to play, order products, or obtain more information on the retrieved program. No simple and automatic technique exists allowing the user to set up a communication from any phone terminal that he or she has access to. The user must memorize the numbers retrieved from the television program, dial them on his or her terminal and trigger the call. The user can thus lose time by memorizing and dialing the number to contact. Moreover, this mechanism can lead to setting up unwanted communications in the event of a user error concerning the memorized numbers.

DISCLOSURE OF THE INVENTION

An exemplary embodiment of the present disclosure proposes a method for making available at least one communication datum retrieved during the consultation of a multimedia stream on a first terminal. The method comprises a step of receiving a request to obtain the at least one communication datum, a step of extracting the at least one communication datum from the multimedia stream, a step of transmitting the at least one extracted communication datum to at least one second terminal, the at least one transmitted communication datum making it possible to implement on the second terminal an application making it possible to set up a multimedia communication between the second terminal and a remote device.

Correlatively, the invention relates to a terminal for making available at least one communication datum retrieved during the consultation of a multimedia stream on the terminal, comprising means for receiving a request to obtain the at least one communication datum, means for extracting the at least one communication datum from the multimedia stream, means for transmitting the at least one extracted communication datum to at least one second terminal, the at least one transmitted communication datum making it possible to implement on the second terminal an application making it possible to set up a multimedia communication between the at least one second terminal and a remote device.

The method for making available a communication datum allows a user to obtain the communication datum, for example on his or her mobile terminal, without having to manually enter the communication datum on his or her terminal. A simple interaction with the first terminal allows him or her to obtain the communication datum on the second terminal. The first terminal can be a terminal of personal computer type or a television or a terminal for retrieving any multimedia stream.

The method according to the invention makes it possible to simplify the access and the use of communication data retrieved on different terminals.

The various modes or characteristics of embodiment mentioned below can be added independently or in combination with each other, to the steps of the method for making available defined above.

The various modes or characteristics of embodiment mentioned below can be added independently or in combination with each other, to the characteristics of the device for making available defined above.

According to a particular embodiment of the invention, the method for making available furthermore comprises a step of converting the at least one received communication datum into the form of a link that can be interpreted by the application of the second terminal.

The communication datum can be thus be interpreted by an application of the second terminal of the user without requiring the intervention of the user or complicated manipulation.

According to another particular embodiment of the invention, the identifier of the at least one second terminal is extracted from the request to obtain the at least one communication datum. The user does not need to enter the identifier of the second terminal into the terminal retrieving the communication datum. It obtains the communication datum in a secure manner.

According to another particular embodiment of the invention, the step of extracting the at least one communication datum comprises a sub-step of analyzing the audio and/or video data of the consulted multimedia stream. This particular embodiment of the invention makes it possible to extract a communication datum even when this datum has not been previously associated with the multimedia stream consulted on the first terminal. It makes it possible to apply the invention to any type of multimedia stream received by the first terminal.

The invention also relates to a method, implemented by a second terminal, for receiving at least one communication datum retrieved during the consultation of a multimedia stream on a first terminal. The method comprises a step of receiving the at least one communication datum, a step of receiving a user validation command, following the retrieving, by the second terminal, of the at least one received communication datum, a step of implementing an application making it possible to set up a multimedia communication between the second terminal and a remote device, from the at least one communication datum in the form of a link that can be interpreted by the application of the second terminal.

Correlatively, the invention also relates to a terminal for receiving at least one communication datum retrieved during the consultation of a multimedia stream on a retrieving terminal comprising means for receiving the at least one communication datum, means for receiving a user validation command, following the retrieval by the receiving terminal of the at least one received communication datum, means for implementing an application making it possible to set up a multimedia communication between the receiving terminal and a remote device, from the at least one communication datum in the form of a link that can be interpreted by the application of the receiving terminal.

The user of the receiving terminal can thus, with a simple click on the receiving terminal, trigger a multimedia communication on the basis of a communication datum that has been retrieved for it on another terminal. Unlike the techniques of the prior art, it is the receiving terminal that triggers the communication desired by the user. The user thus has the option of triggering the communication immediately or triggering it later.

The various modes or characteristics of embodiment mentioned below can be added independently or in combination with each other, to the steps of the receiving method defined above.

The various modes or characteristics of embodiment mentioned below can be added independently or in combination with each other, to the characteristics of the receiving device defined above.

According to a particular embodiment of the invention, the receiving method comprises, prior to the step of implementing the application, a step of converting the at least one received communication datum into the form of a link that can be interpreted by the application of the second terminal. Thus, when the first terminal cannot carry out the conversion, the second terminal carries out the conversion of the communication datum itself so that the triggering of the communication remains simple for the user.

According to another particular embodiment of the invention, the at least one communication datum is associated with additional information allowing the user to identify the at least one communication datum.

This particular embodiment of the invention is particularly advantageous in the case where the second terminal receives several communication data, or if the user wishes to store the communication datum and be able to identify it later.

According to another particular embodiment of the invention, the receiving method comprises a prior step of sending a request to obtain the at least one communication datum to the first terminal. Correlatively, the receiving terminal comprises means for sending a request to obtain the at least one communication datum to the retrieving terminal.

For example, the receiving terminal is thus capable of interacting with the first terminal and obtaining information without the need to associate the receiving terminal with the first terminal beforehand.

The invention also relates to a computer program including instructions for executing the method for making available according to any of the particular embodiments of the invention mentioned earlier, when the program is executed by a processor.

The invention also relates to a computer program including instructions for executing the receiving method according to any of the particular embodiments of the invention mentioned earlier, when the program is executed by a processor.

The invention also relates to a storage medium readable by a processor on which is stored a program including instructions for executing the method for making available according to any of the particular embodiments of the invention mentioned earlier.

The invention also relates to a storage medium readable by a processor on which is stored a program including instructions for executing the receiving method according to any of the particular embodiments of the invention mentioned earlier.

LIST OF FIGURES

Other advantages and characteristics of the invention will become more clearly apparent upon reading the following description of a particular embodiment of the invention, given by way of simple illustrative and non-limiting example, and the appended drawings, among which.

DESCRIPTION OF A PARTICULAR EMBODIMENT OF THE INVENTION

Figures 1, 6, 7:
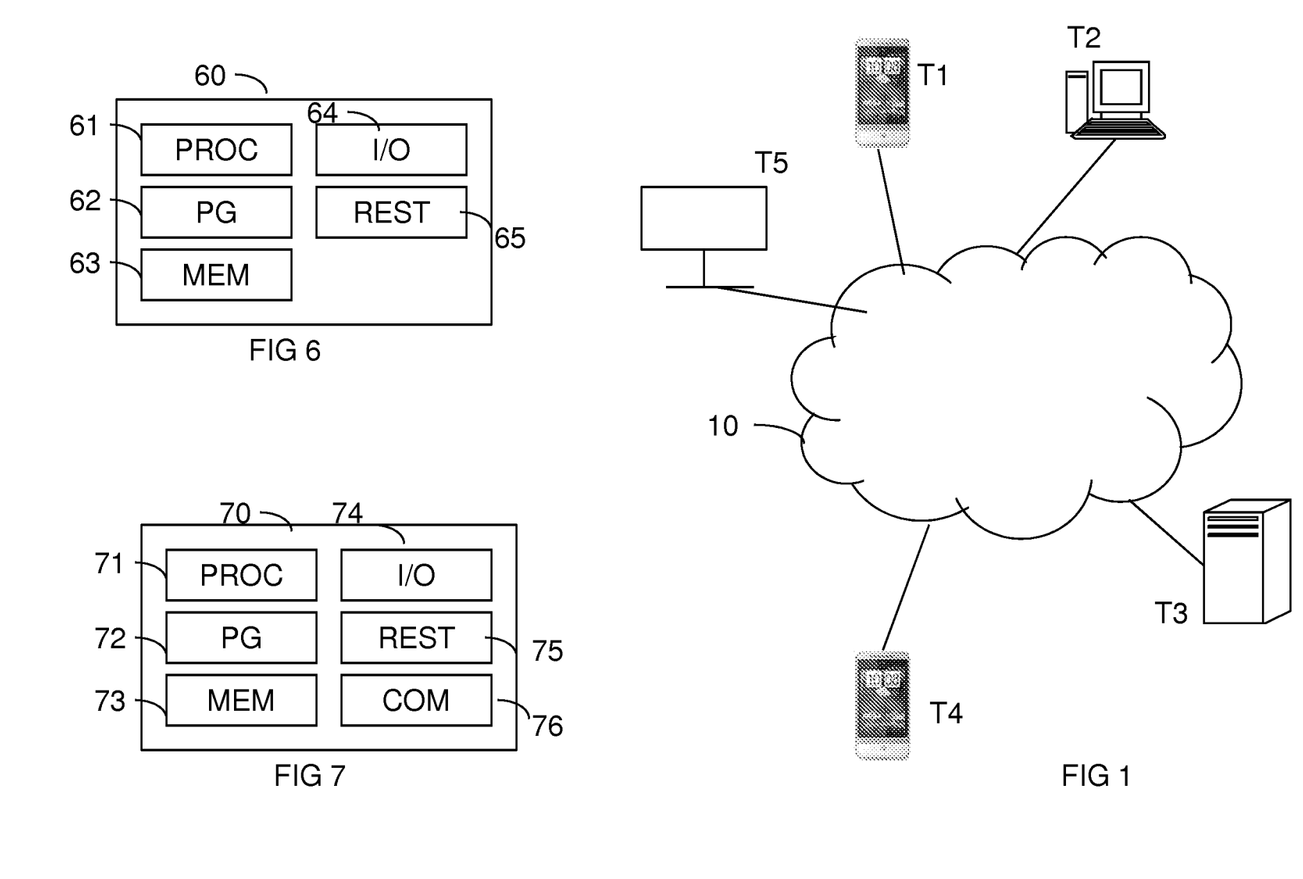
FIG. 1 shows an environment for implementing the method for making available and the method for receiving a communication datum according to particular embodiments of the invention.
FIG. 6 illustrates a device making it possible to implement the method for making available at least one communication datum according to a particular embodiment of the invention.
FIG. 7 illustrates a device making it possible to implement the method for receiving at least one communication datum according to a particular embodiment of the invention.

FIG. 1 shows an environment for implementing the method for making available and the method for receiving a communication datum according to particular embodiments of the invention. The environment for example comprises terminals T1 to T5 interlinked via one or more telecommunications networks 10. The terminals T1 and T4 are for example mobile or fixed-line phone terminals connected to a mobile telecommunications network, and/or circuit-switched telecommunications and/or IP (for Internet Protocol) telecommunications. The terminal T2 is a terminal of personal computer type connected to an IP telecommunication network by way of a residential gateway or a modem (not represented). The terminal T5 is a television connected for example to the IP communication network by way of a residential gateway and able to receive television streams via the IP network or over the airwaves. The terminal T5 can also be composed of an independent screen and a decoder of multimedia streams. The terminal T3 is for example a server of multimedia data connected to the IP network.

According to a particular embodiment of the invention, a user possessing a mobile terminal T1, for example consults on the terminal T2 a web page notably displaying the phone numbers of a third party to be contacted. When the user clicks on the phone numbers displayed on the terminal T2, the method for making available at least one communication datum is implemented by the terminal T2 and the displayed phone numbers are broadcast by the terminal T2 for example into the form of a link that can be interpreted by an application of the terminal T1. The terminal T1 then implements the method for receiving at least one communication datum. The received communication datum is interpreted for example on the terminal T1 by an application of the "Click to call" type previously installed on the terminal. By clicking on the number that is displayed on the terminal T1, the user can thus make a call for example to the terminal T4 if the phone numbers match those of the terminal T4.

According to another particular embodiment of the invention, the user consults on the terminal T5 a television stream in which the numbers are displayed or announced by a presenter of the television program being watched. Using his or her terminal T1, the user sends to the terminal T5 a request to obtain the numbers retrieved on the terminal T5. The terminal T5 implements the method for making available at least one communication datum and sends to the terminal T1 the numbers retrieved on the terminal T5. The terminal T1 then implements the method for receiving at least one communication datum. The user can choose for example to make a call or to send a message of SMS type using the received numbers interpreted for example by an application of the "Click to call" type.

In a variant of this particular embodiment of the invention, instead of the numbers retrieved by the terminal T5, the user can request, using his or her terminal T1, to obtain additional information on the television program that he or she is viewing. The terminal T5 implements the method for making available at least one communication datum and sends the communication datum to the terminal T1 in the form of a communication link to a web page containing the additional information requested. The terminal T1 then implements the method for receiving at least one communication datum. A web browsing application of the terminal T1 can for example interpret the communication link received and set up a communication with a server T3 of multimedia data. The additional information is then displayed on the terminal T1.

Figure 2:
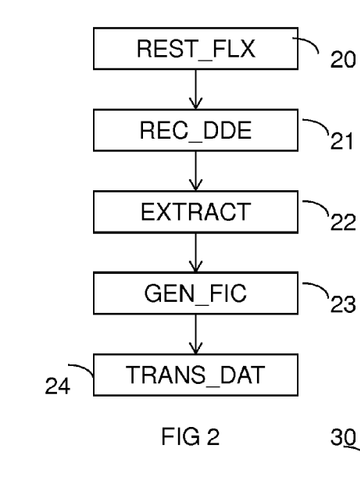
FIG. 2 illustrates steps of the method for making available at least one communication datum according to a particular embodiment of the invention.

FIG. 2 illustrates steps of the method for making available at least one communication datum according to a particular embodiment of the invention.

A step 20 (REST_FLX) of retrieving a multimedia stream is implemented for example by the terminal T2 in FIG. 1. The multimedia stream corresponds for example to a web page that can contain text, images, videos, sounds etc. The multimedia stream can for example also be an electronic message displayed using an electronic messaging application for example. At least one communication datum, for example a phone number, is displayed on the web page or in the window displaying the electronic message.

The rest of the method is described using an example of an application displaying the phone number on a web page.

The terminal T2 receives (REC_DDE) a request to obtain the displayed communication datum, while detecting in a step 21 that a user has clicked on the site of the communication datum on the web page.

In order to detect the phone number selected by the user, the displayed number can be displayed in a form capable of being recognized by the web browser as a communication datum, for example using dedicated tags in the HTML code of the web page.

In a variant, when the phone number is not in a form directly recognizable by the web browser, an application incorporated into the web browser can detect the number by analyzing the source code of the web page and the contents of the source code tags. The application incorporated into the web browser can then render the displayed numbers capable of being selected by the user, for example by displaying a possible action when the user passes his or her selection pointer over the number. The selection of the number thus detected can be made by a simple click of the user on the number or a right-click allowing the rest of the method to be triggered.

The terminal T2 extracts (EXTRACT) in a step 22 the corresponding phone number, for example by analyzing the source code of the web page as described above.

According to a particular embodiment of the invention, in a step 23, the terminal T2 then generates (GEN_FIC) a file comprising the extracted communication datum. The generated file is for example a file in the HTML (HyperText Markup Language) or XML (eXtensible Markup Language) format that can be interpreted by a web browsing application.

In a step 24, the terminal T2 broadcasts (TRANS_DAT) the extracted communication datum, or the generated file containing the communication datum, to the nearby terminals. For example the terminal T2 uses a connection of Bluetooth® type or a local network of WIFI type for broadcasting.

The terminals near the terminal T2 can then receive the communication datum thus broadcast, and notably the terminal T1 of the user.

According to a particular embodiment of the invention, the user of the terminal T2 can have clicked on several phone numbers and wish to receive on his or her terminal T1 all the phone numbers on which he or she has clicked.

The terminal T2 then extracts all the communication data corresponding to the successive phone numbers on which the user has clicked. In the step 23 of generating the file, the terminal T2 also implements a step of aggregating the extracted communication data. Thus, a single file containing several communication data will be broadcast.

According to another particular embodiment of the invention, the terminal T2 can also add to the generated file information relating to at least one communication datum allowing the user to identify the communication datum, such as the information resulting from the metadata of the web page, notably corresponding to the data of page title or paragraph type, for example.

Figure 3:
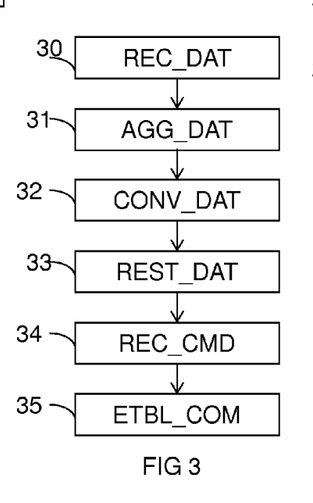
FIG. 3 illustrates steps of the method for receiving at least one communication datum according to a particular embodiment of the invention.

FIG. 3 illustrates steps of the method for receiving at least one communication datum according to a particular embodiment of the invention. The receiving method is for example implemented by the terminal T1 which is situated near the terminal T2 implementing the method for making available a communication datum, for example as described in relation to FIG. 2.

In a step 30, the terminal T1 receives (REC_DAT) a communication datum for example in the form of an HTML or XML file that can be interpreted by a web browsing application of the terminal T1.

According to another particular embodiment of the invention, the communication datum can also be received in another data format, for example a file in the text format, or in the CSV-type (for Comma Separated Values) format, or another format. For example for a file in the text format, each line will correspond to a number, and separators, for example a double ";", separate a phone number data element from the various additional information items, which can for example be the name and first name of the person, in the title of the HTML page in question, a title of an advertisement for example. Each line of the file ends in the ASCII (for American Standard Code for Information Interchange) code corresponding to a carriage return.

According to this embodiment, the terminal T1 carries out a conversion of the transmitted communication datum so that it can be interpreted by an application of the terminal T1, for example a web browsing application, and the communication datum is then converted, for example into the form of an HTML or XML file. Thus for example, the text file described above is converted into an HTML file, by adding the HTML code tags making it possible to define an HTML page, such as <html> to enclose the content. Inside the page, a table can be created by the tags <table> and </table> to present the content with a formulation of the following type:

```
<table>
    <tr>
        <td>Number1</td>
        <td>Information label 1 </td>
        <td>Second label 1</td>
    </tr>
    <tr>
        <td>Number2</td>
        <td>Information label 2 </td>
        <td>Second label 2</td>
    </tr>
</table>
```

Each line is enclosed by the tags <tr> and </tr> and at the level of a line, each data element is enclosed by the tags <td> and </td>.

The numbers can be selected by the user, for example by clicking on the displayed numbers.

In this example, the conversion of the text file into an HTML file consists in adding the tags indicating that it is an HTML file, then in positioning each line of the text file, determined from the carriage return of the text file, between 2 tags <tr> and </tr> of the table, while removing the ASCII code of this carriage return. Then inside a line, each data element determined in the text file by the aforementioned separator is positioned between 2 tags <td> and </td> and to remove the characters separating the data elements. The file thus created is stored in a file with the extension ".html".

In a variant, the application of the terminal T1 can also be a mobile telephony or IP telephony application. In this case, the communication datum is converted into the form of a contact datum, or of phone number data that can be directly used by the telephony application.

According to another particular embodiment of the invention, the terminal T1 can receive a group of communication data originating from one and the same terminal or from different terminals. The terminal T1 then implements a step 31 (AGG_DAT) of aggregating communication data and displays to the user all the received communication data. The communication data can be received in a file that can be interpreted by a web browsing application of the terminal T1.

In a variant, they can be received in another format and require a step 32 (CONV_DAT) of data conversion. The conversion step makes it possible to obtain a data file that can be interpreted for example by a web browsing application. According to this variant, the received communication data are converted for example into the form of links inserted into an HTML or XML file displayed by the web browsing application.

In a step 33, the communication datum or data are visually or vocally retrieved for the user on the terminal T1.

According to a particular embodiment of the invention, the terminal T1 can carry out a security analysis of the communication data received in order to identify if the communication data received contain any data harmful to the operation of the terminal T1, for example data of the computer virus type.

According to another particular embodiment of the invention, the receiving of communication data by the terminal T1 can be associated with a ringtone or a vibration implemented by the terminal T1 in order to inform the user that the datum has been received.

The user can then send a validation command (REC_CMD) to the terminal T1 making it possible to validate at least one communication datum received and to allow its storage, at least temporarily, in the memory of the terminal T1. The validated communication datum can then be used in order to set up (ETBL_COM) a multimedia communication, for example a phone call or a sending of a message, to the terminal corresponding to the number associated with the communication datum.

If the user wishes for an immediate call from the correspondent, the set-up of the call can be implemented in the step 35 for example by an application of "Click to call" type installed on the terminal T1.

The user can also preserve the communication datum in the memory of his or her terminal T1 in order to set up a communication later on using a mobile or IP telephony application or a messaging application.

Figure 4:
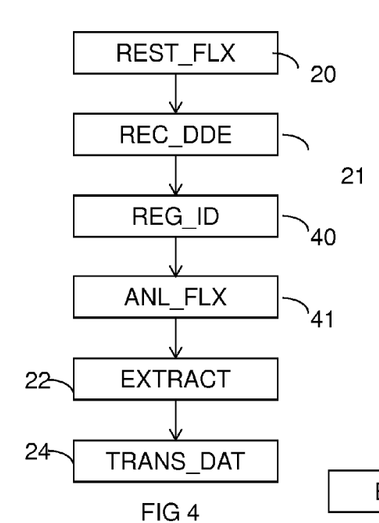
FIG. 4 illustrates steps of the method for making available at least one communication datum according to another particular embodiment of the invention.

FIG. 4 illustrates steps of the method for making available at least one communication datum according to another particular embodiment of the invention.

A step 20 (REST_FLX) of retrieving a multimedia stream is implemented, for example by the terminal T5 in FIG. 1. The multimedia stream for example corresponds to a television program in which a communication datum is retrieved on the terminal T5. This communication datum can for example correspond to a phone number, optionally associated with one or more SMS (for Short Message Service) codes, which appears in the image or which is announced by a program presenter. The phone number for example allows a user to take part in a game, to obtain additional information relating to the retrieved program, or to order products presented in the program. The communication datum can also correspond to a communication link, for example an Internet link making it possible to obtain additional information relating to the retrieved program.

In a step 21, the terminal T5 receives (REC_DDE) a request to obtain the retrieved communication datum for example originating from the terminal T1 of the user.

According to a particular embodiment of the invention, the type of the communication datum requested, for example a communication link or phone numbers, can be associated with the request for the communication datum and extracted from the request.

According to a particular embodiment of the invention, in a step 40, the terminal T5 extracts from the request to obtain the communication datum an identifier of the terminal T1 and temporarily stores (REG_ID) this identifier in the memory.

According to another particular embodiment of the invention, the terminal T5 receives the request to obtain a communication datum originating from a remote control that makes it possible to interact with the terminal T5. The remote control allows a user to indicate to the terminal T5 a wish to make a communication or to receive more information on a terminal. For example different keys, or combinations of different keys, can be used on the remote control to indicate the wish of the user.

The terminal T5 not having received any terminal identifier associated with the request, the request to obtain the datum and the communication datum that will be extracted in the rest of the method can be temporarily stored while awaiting a validation request from the terminal.

In a variant of this particular embodiment, the request to obtain a communication datum can originate from a vocal command made by the user intended for the terminal T5 or via the remote control of the terminal T5.

According to a particular embodiment of the invention, the terminal T5 can receive several requests to obtain communication data originating from one and the same terminal or from different terminals. The received requests are then temporarily stored in the memory of the terminal T5 and processed in succession. According to another particular embodiment of the invention, the search for the communication datum can be shared, for example if the requests to obtain the datum are received in a short time interval, in the order of a few seconds for example. If the requests originate from one and the same terminal, the terminal T5 can reply to it by the subsequent simultaneous or successive sending of communication data.

According to another particular embodiment of the invention, the terminal T5 then implements a step 41 of analyzing the retrieved multimedia stream (ANL_FLX) in order to extract the communication datum from the multimedia stream. For example, the analysis can consist in an analysis of OCR (Optical Character Recognition) type. This analysis is implemented on the images of the multimedia stream in order to identify a displayed communication datum. The OCR analysis is conventionally known in the prior art, for example in "Videotext OCR using hidden Markov models", by Natarajan P, Elm ieh B, Schwartz B, and Makhoul J., published in *Proceedings of 6th International Conference on Document Analysis and Recognition,* 2001. Other known OCR techniques can be used to implement this analysis.

The analysis can also consist in an analysis of the audio data of the multimedia stream, for example by vocal recognition, in order to identify a read communication datum. The analysis can also consist in a combination of these two types of analysis on the audio and video data.

In a variant of this particular embodiment of the invention, several communication data can be extracted, for example to take account of the reaction time of a user following the broadcasting of a number during a broadcast program.

According to another particular embodiment of the invention, the step of analyzing the multimedia stream can be implemented continuously on the multimedia stream in order to constantly extract communication data retrieved by any program. The communication data are then stored and time-stamped temporarily in the memory on the terminal T5 in order to be used, where applicable, upon the receiving of a request to obtain a communication datum.

According to another particular embodiment of the invention, the analysis step can be implemented by a remote server on the multimedia stream. According to the choice of implementation of this particular embodiment of the invention, the analysis can be implemented continuously or on demand. This embodiment makes it possible to share the analysis of the multimedia stream between several users. In this particular embodiment of the invention, the terminal T5 sends to the remote server a command to analyze the multimedia stream as well as an item of information on the time interval over which the analysis must be implemented. The remote server sends it in return at least one communication datum identified in the multimedia stream.

According to another particular embodiment of the invention, the communication datum can be sent simultaneously with the multimedia stream as an additional datum associated with the stream.

The terminal T5 extracts (EXTRACT) in a step 22 the communication datum of the analyzed data from the multimedia stream, or following the receiving of the communication datum originating from a remote server or the multimedia stream when the datum is sent simultaneously to the stream.

According to a particular embodiment of the invention, the terminal T5 can generate a file similar to the step (GEN_FIC) described in relation to FIG. 2.

In a step 24, the terminal T5 transmits (TRANS_DAT) the extracted communication datum to the terminal T1 using the previously stored terminal identifier. For example, the terminal T5 uses a connection of Bluetooth® type or a local network of WIFI type for transmission.

According to a particular embodiment of the invention, before carrying out the transmission of the extracted communication datum, the terminal T5 can wait until a request is received to validate a terminal, for example the terminal T1. The terminal T5 temporarily stores the extracted communication datum in the memory. Upon receiving the validation request by the terminal T1 for example, the terminal T5 extracts from the validation request the identifier of the terminal T1 and transmits the stored communication datum to it. This embodiment is particularly advantageous when the user wishes to interact on a multimedia stream retrieved by the terminal T5 but does not have any terminal T1 nearby. Often, a remote control is close to the retrieving terminal T5 and it is therefore quicker for the user to interact with an instant of the multimedia stream using the remote.

When the user is available to trigger a communication, he or she can use the terminal T1 in order to validate the request for a communication datum on the terminal T5 and receive it on his or her terminal T1.

According to a particular embodiment of the invention, the terminal T5 can have extracted several communication data from the multimedia stream. In this case, the terminal T5 sends the extracted communication data to the terminal T1. According to a particular embodiment of the invention, the terminal T5 aggregates the communication data in a file before the transmission to the terminal T1.

In a variant, the terminal T5 can also add to the generated file items of information relating to at least one communication datum allowing the user to identify the communication datum.

According to another particular embodiment, the method described in FIG. 4 can also be applied to the case where the communication datum is displayed (REST_FLX) on the terminal of personal computer type T2. The terminal T2 receives (REC_DDE) a request to obtain a communication datum from terminal T1. In this embodiment, a software application that may have been previously installed on the terminal T2 makes it possible to search for and detect an active window of the terminal T2. An active window of the terminal T2 can for example be a web browser window, or a window of a messaging application open on the terminal T2, or else a word processing document. The software application also makes it possible to detect in the active window at least one displayed communication datum.

In this embodiment, it is possible to detect phone numbers or links of hypertext type, as well as additional information associated with these communication data and allowing them to be identified.

After receiving the request to obtain a communication datum, the terminal T2 extracts from the request to obtain a datum an identifier of the terminal T1 and temporarily stores (REG_ID) this identifier in the memory.

The terminal T2 analyzes the multimedia stream retrieved on the terminal T2 in order to extract at least one communication datum. The multimedia stream can for example be an active window of the terminal T2 (ANL_FLX). The extraction of the communication data can for example be carried out by analyzing the source code of a web page or of the electronic message if the active window is a window of a web browsing application or a window of an electronic messaging application. If the active window is of a word processing application, the terminal T2 can analyze the contents of the document displayed in the active window.

The terminal T2 extracts (EXTRACT) at least one communication datum of the analyzed data from the multimedia stream and generates a file in a similar manner to the step (GEN_FIC) described in relation to FIG. 2. In this embodiment, the user not having previously selected a particular communication datum on the screen of the terminal T2, it is probable that the terminal T2 will extract more than one communication datum retrieved by the multimedia stream. In this variant, the terminal T2 can aggregate the extracted communication data into one and the same file.

Figure 5:
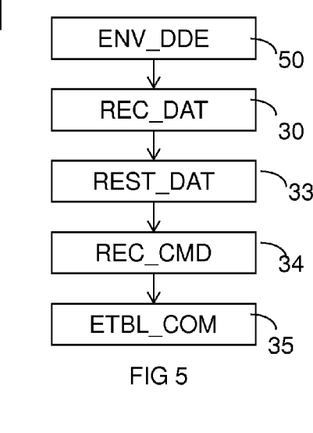
FIG. 5 illustrates steps of the method for receiving at least one communication datum according to another particular embodiment of the invention.

The terminal T2 transmits (TRANS_DAT) the extracted communication datum to the terminal T1 using the previously stored terminal identifier. For example, the terminal T2 uses a connection of Bluetooth® type or a local network of WIFI type for transmission. FIG. 5 illustrates steps of the method for receiving at least one communication datum according to another particular embodiment of the invention. The receiving method is for example implemented by the terminal T1 which is situated near the terminal T5 implementing the method for making available a communication datum, for example as described in relation to FIG. 4.

During the consultation of a multimedia stream on the terminal T5, the terminal T1 then makes, in a step 50, a request to obtain (ENV_DDE) a communication datum retrieved on the terminal T5.

According to a particular embodiment of the invention, a dedicated application is installed on the terminal T1 allowing the terminal to interact with the terminal T5.

In a step 30, the terminal T1 receives in return (REC_DAT) the communication datum, for example in the form of an HTML or XML file that can be interpreted by a web browsing application of the terminal T1 or in any other format that can be interpreted by a telephony application for example.

According to a particular embodiment of the invention, the terminal T1 can receive several communication data either in succession, or aggregated into one and the same datum file.

In a step 33, the communication datum or data are visually or vocally retrieved for the user on the terminal T1.

The user can then send a validation command (REC_CMD) to the terminal T1 making it possible to validate at least one communication datum received and to allow it to be at least temporarily stored in the memory of the terminal T1. The validated communication datum can then be used in order to set up (ETBL_COM) a multimedia communication, for example a phone call or a sending of a message, toward the terminal corresponding to the number associated with the communication datum.

If the user wishes for an immediate call from the correspondent, the set-up of the call can be implemented in the step 35, for example by an application of "Click to call" type installed on the terminal T1.

The user can also preserve the communication datum in the memory of his or her terminal T1 in order to set up a communication later on using a mobile or IP telephony application or a messaging application.

According to another particular embodiment of the invention, when the communication datum is a communication link making it possible to obtain additional information related to the retrieved program, the terminal T1 sets up (ETBL_COM) a communication with a remote server of multimedia data using the communication link. The communication link contains an addressing datum making it possible to address the remote server. The remote server then sends to the terminal T1 items of information related to the retrieved program.

FIG. 6 illustrates a device 60 making it possible to implement the method for making available at least one communication datum according to a particular embodiment of the invention.

The device corresponds for example to a terminal, of TV or personal computer type.

The device comprises a storage space 63, for example a memory (MEM), a processing unit 61, equipped for example with a microprocessor (FROG), and controlled by the computer program (PG) 62, implementing the method for making available at least one communication datum as described in the invention with reference to FIG. 2 or 4.

At set-up, the code instructions of the computer program 62 are for example loaded into a RAM memory before being executed by the processor of the processing unit 61. The microprocessor of the processing unit 61 implements the steps of the method for making available at least one communication datum retrieved during the consultation of a multimedia stream on the device, and notably the steps of receiving a request to obtain the at least one communication datum, of extracting the at least one communication datum from the multimedia stream, of transmitting to at least one terminal the at least one extracted communication datum, the transmitted at least one communication datum making it possible to implement on the terminal an application making it possible to set up a multimedia communication between the terminal and a remote server, according to the instructions of the computer program 62.

To do this, the device 60 comprises means 65 for retrieving (REST) a multimedia stream, for example a screen and loudspeakers.

The device 60 also comprises means 64 for receiving and transmitting data (I/O), such as a network connection interface, for example of Bluetooth®, WIFI, infrared, or IP type.

A module for extracting the at least one communication datum from the multimedia stream is controlled by a computer program PG implemented by a processor PROC using a memory MEM.

According to a particular embodiment of the invention, the device comprises means (MEM) for storing, at least temporarily, an identifier of a terminal sending a request to obtain a communication datum. The storing means also make it possible, according to another particular embodiment of the invention, to store communication data received simultaneously in the multimedia stream.

FIG. 7 illustrates a device 70 making it possible to implement the method for receiving at least one communication datum according to a particular embodiment of the invention.

The device corresponds for example to a terminal, of mobile, fixed-line, smartphone or tablet type.

The device comprises a storage space 73, for example a memory (MEM), a processing unit 71, equipped for example with a microprocessor (FROG), and controlled by the computer program (PG) 72, implementing the method for receiving at least one communication datum as described in the invention with reference to FIG. 3 or 5.

At set-up, the instructions of computer program code 72 are for example loaded into a RAM memory before being executed by the processor of the processing unit 71. The microprocessor of the processing unit 71 implements the steps of the method for receiving at least one communication datum retrieved during the consultation of a multimedia stream on a terminal, and notably the steps of receiving the at least one communication datum, of receiving a user validation command, following the retrieval by the device of the at least one received communication datum, of implementing an application making it possible to set up a multimedia communication between the device and a remote device, from the at least one communication datum in the form of a link that can be interpreted by the application of the device, according to the instructions of the computer program 72.

To do this, the device 70 comprises means 74 for receiving and transmitting (I/O) data, such as a network connection interface, for example of Bluetooth®, WIFI, infrared or IP type.

According to a particular embodiment of the invention, the receiving and transmitting means allow the device to make a request to obtain a communication datum.

The receiving and transmitting means also allow the device to receive a transmitted communication datum.

The device 70 also comprises means 75 for retrieving (REST) communication data, for example a screen and loud speakers. An application of the device 70 capable of interpreting the communication datum received by the device is controlled by a computer program PG implemented by a processor PROC using a memory MEM.

According to a particular embodiment of the invention, this application can be a web browsing application.

According to another particular embodiment of the invention, this application can be a telephony or messaging application.

According to a particular embodiment of the invention, the device comprises means (MEM) for at least temporarily storing a communication datum received.

The device also comprises communicating means 76 (COM) making it possible to set up a multimedia communication between the device and a remote device, for example a phone terminal or a server. The communicating means can for example be a network interface making it possible to set up a communication on a mobile or a circuit-switched network, or an IP network.

Although the present disclosure has been described with reference to one or more examples, workers skilled in the art will recognize that changes may be made in form and detail without departing from the scope of the disclosure and/or the appended claims.

The invention claimed is:

1. A method for making available at least one communication datum retrieved during consultation by a user of a multimedia stream on a first terminal, wherein the method comprises:
   a step of receiving a request to obtain the at least one communication datum, said at least one communication datum allowing to set up a multimedia communication between a second terminal of said user and a remote device,
   a step of extracting the at least one communication datum from the multimedia stream,
   a step of storing the extracted communication datum,
   a step of receiving from said second terminal of said user, a request for validation of the request to obtain the at least one communication datum,
   a step of extracting an identifier of the second terminal from the validation request received,
   a step of transmitting the at least one extracted communication datum to the second terminal, the at least one transmitted communication datum configured to enable implementation on the second terminal an application that sets up a multimedia communication between the second terminal and the remote device.

2. The method for making available as claimed in claim 1 wherein the method furthermore comprises a step of converting the at least one extracted communication datum into the form of a link that can be interpreted by the application of the second terminal.

3. The method for making available as claimed in claim 1, wherein the request to obtain the at least one communication datum is made by a remote control suitable for interacting with the first terminal.

4. The method for making available as claimed in claim 1, wherein the step of extracting the at least one communication datum comprises a sub-step of analyzing the audio and/or video data of the consulted multimedia stream.

5. A method, implemented by a second terminal of a user, for receiving at least one communication datum retrieved during consultation by the user of a multimedia stream n a first terminal of the user, wherein the method comprises:
   a step of validating a request to obtain the at least one communication datum sent to the first terminal, said at least one communication datum allowing to set up a multimedia communication between the second terminal of said user and a remote device,
   a step of receiving the at least one communication datum from the first terminal of the user,
   a step of receiving a user validation command, following retrieving, by the second terminal, of the at least one received communication datum,
   a step of implementing an application that sets up the multimedia communication between the second terminal and the remote device, from the at least one communication datum in the form of a link that can be interpreted by the application of the second terminal.

6. The method as claimed in claim 5, wherein the method comprises, prior to the step of implementing the application, a step of converting the at least one received communication datum into the form of a link that can be interpreted by the application of the second terminal.

7. The method as claimed in claim 5, wherein the at least one communication datum is associated with additional information allowing the user to identify the at least one communication datum.

8. The method as claimed in claim 5, wherein the at least one communication datum is stored in a memory of the second terminal.

9. A terminal for making available at least one communication datum retrieved during consultation by a user of a multimedia stream on the terminal for making available, wherein the terminal comprises:

means for receiving a request to obtain the at least one communication datum, said at least one communication datum allowing to set up a multimedia communication between a second terminal of said user and a remote device,     means for extracting the at least one communication datum from the multimedia stream,     means for storing the extracted communication datum,     means for receiving from said second terminal of said user, a request for validation of the request to obtain the at least one communication datum,     means for extracting an identifier of the second terminal of the received validation request,     means for transmitting the at least one extracted communication datum to the second terminal, the at least one transmitted communication datum making it possible to implement on the second terminal an application making it possible to set up a multimedia communication between the second terminal and the remote device.

10. A receiving terminal of a user for receiving at least one communication datum retrieved during consultation by the user of a multimedia stream on a retrieving terminal of the user, wherein the receiving terminal comprises:

means for validating a request to obtain the at least one communication datum sent to the retrieving terminal, said at least one communication datum allowing to set up a multimedia communication between the receiving terminal of said user and a remote device,     means for receiving the at least one communication datum from the retrieving terminal of the user,     means for receiving a user validation command, following retrieval by the receiving terminal of the at least one received communication datum,     means for implementing an application making it possible to set up the multimedia communication between the receiving terminal and the remote device, from the at least one communication datum in the form of a link that can be interpreted by the application of the receiving terminal.

\* \* \* \* \*

UNITED STATES PATENT AND TRADEMARK OFFICE
CERTIFICATE OF CORRECTION

PATENT NO. : 9,549,002 B2
APPLICATION NO. : 14/381863
DATED : January 17, 2017
INVENTOR(S) : Ghislain Moncomble It is certified that error appears in the above-identified patent and that said Letters Patent is hereby corrected as shown below:

In the Claims

Claim 5 Column 14, Line 51, delete "n", insert --on--.

Signed and Sealed this
Twelfth Day of March, 2019

Andrei Iancu
*Director of the United States Patent and Trademark Office*